INVENTOR
FRANS V. A. PANGALILA

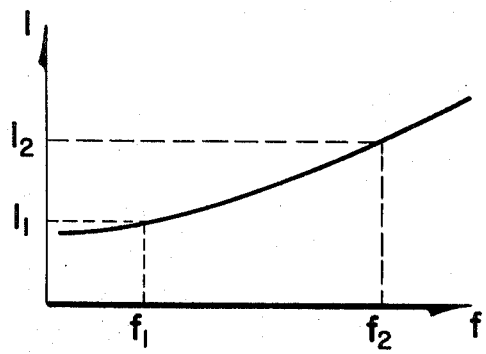
FREE SURFACE
FIG. 1
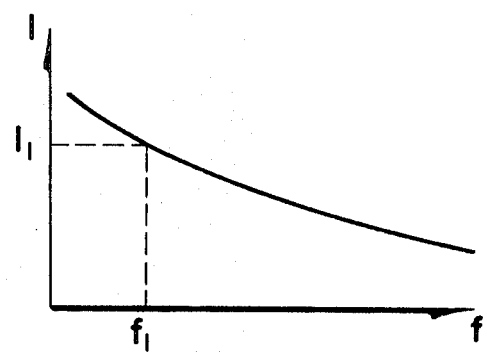
U-TUBE
FIG. 2
FIG. 3
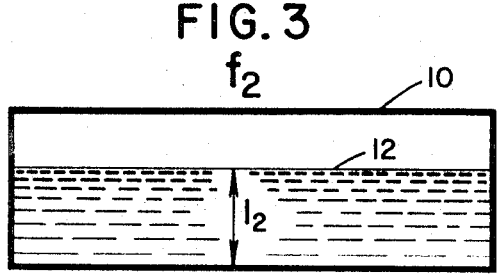
FIG. 4
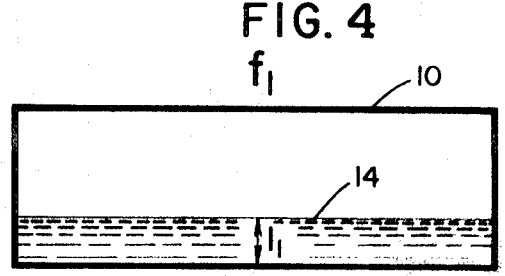
FIG. 7
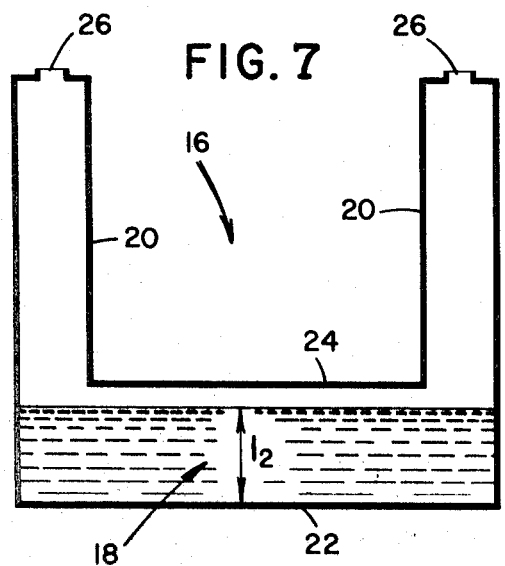
FIG. 8
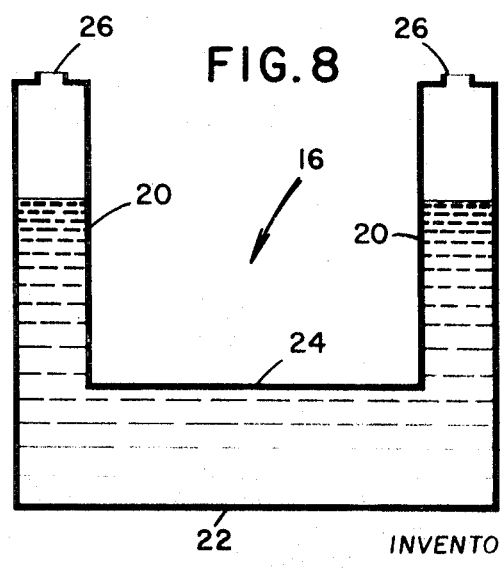
INVENTOR
FRANS V. A. PANGALILA Nov. 23, 1971  F. V. A. PANGALILA  3,621,804
METHOD FOR STABILIZING A SHIP WITH CHANGING GM
Filed Oct. 10, 1969  2 Sheets-Sheet 2

BY *Flehr, Hohbach & Jacobson*
ATTORNEYS

United States Patent Office 3,621,804
Patented Nov. 23, 1971

3,621,804
METHOD FOR STABILIZING A SHIP WITH CHANGING GM
Frans V. A. Pangalila, Matawan Township, N.J., assignor to Flume Stabilization Systems, Inc., Hoboken, N.J.
Filed Oct. 10, 1969, Ser. No. 865,417
Int. Cl. B63b *43/06*
U.S. Cl. 114—125          2 Claims

ABSTRACT OF THE DISCLOSURE

A passive stabilizing tank for use in a vessel whose GM is apt to change substantially, and a method of operating such a tank. The tank of the present invention is in the form of a U-shaped tank with an optional cross-over duct bridging the upstanding members of the tank. When filled with a liquid up to a predetermined level, the tank functions as a free-surface tank having a given frequency range. When, however, the liquid level in the tank is raised above a predetermined limit, the tank functions as a U-tube tank having a frequency range substantially less than the frequency range of the free-surface tank. The present invention further relates to a method of stabilizing a ship whose GM is apt to change substantially, comprising adjusting the liquid level in a tank so that the tank functions as either a free-surface tank or as a U-tube tank.

BACKGROUND OF THE INVENTION

The passive tank stabilizer has, recently, gained wide acceptance in the shipping industry. Many ships are fitted with tanks for purposes of roll reduction.

As is well known, a stabilizing problem often exists when a ship travels under a wide variety of load conditions. This problem results from the fact that the load condition is an important factor in defining the resonant frequency of the ship. Thus, when a ship travels part of its voyage in an unloaded condition, part of its voyage in a partially loaded condition, and part of its voyage in a fully loaded condition, the stabilizer must be extremely flexible in its performance, as the GM may change substantially.

One method of coping with this problem is to vary the level of liquid in the stabilizing tank, this varying the resonant frequency of the stabilizing tank. Thus, the tank can be matched to the ship by acting on the liquid level in the tank. More particularly, if the liquid level in a free-surface tank is reduced, the resonant frequency of the tank decreases and, hence, the tank becomes better suited for stabilizing a ship having a low GM. The converse is also true.

The "solution" of varying the tank liquid level to meet the requirements of a particular ship is not without its problems. A typical problem may be outlined as follows.

A long period container ship is fitted with a free-surface tank stabilizer. Naturally, it is advantageous to design the stabilizer to function under all load conditions of the ship. When the ship is unloaded, the liquid level in the free-surface stabilizing tank will be relatively high. (The GM of the unloaded ship is high.) When the ship is partially loaded, the GM of the ship is decreased, and, consequently, the liquid level must be reduced to match the tank to the ship. When the ship is fully loaded, the liquid level must be reduced even farther for proper matching.

When the tank liquid level is high, the stabilizing moment developed by the tank is substantial. However, when the liquid level is low, the stabilizing moment developed by the tank is correspondingly low. The problem often occurs, that in order to match a free-surface tank to a loaded container ship, the liquid level must be so low that the effects of the free-surface tank stabilizer are substantially reduced.

It is toward the elimination of the above-outlined problem that the present invention is directed.

SUMMARY OF THE INVENTION

The present invention relates to a stabilizing tank which, depending upon its liquid level, functions as either a free-surface stabilizer or as a U-tube stabilizer. The present invention further deals with the method of stabilizing a ship whose GM varies substantially, comprising altering the liquid level in such a manner that the tank is changed from a free-surface tank to a U-tube tank, or vice versa.

In the art relating to stabilizing ships with passive tank stabilizers, the free-surface tank is particularly suitable. It is well known that when the GM of a ship is increased, a larger stabilizing moment is needed to attain the same roll reduction as before the GM increase (assuming, of course, that the displacement of the ship remains constant). Therefore, when the GM increases, it is advantageous to use a tank whose liquid level must be increased to match the tank to the ship.

In the free-surface tank, the liquid level must be raised if the GM of the ship is increased; but in the U-tube type tank, the liquid level must be lowered if the GM of the ship is increased. Thus, the free-surface tank fits well into the scheme of passive tank stabilizing. The U-tube tank does not.

The trust of the statements made in the preceding paragraph will become clear from the following. As the GM of the ship increases, so too does the frequency of the ship ($\omega_{\text{ship}} = K\sqrt{GM_{\text{ship}}}$). The equation of the free-surface tank is:

$$\omega_{\text{tank}} = K_1 \sqrt{h}$$

where $h$ is the level of liquid in the tank. The equation of the U-tube tank is:

$$\omega_{\text{tank}} = K_2 \sqrt{1/l}$$

where $l$ is the total length of the column of liquid housed in the tank. Thus, when the GM of a ship increases (increasing the resonant frequency of the ship), proper matching in a free-surface tank requires the addition of liquid; proper matching of a U-tube tank requires the removal of liquid. For the above reasons, the free-surface tank is widely used in the shipping industry, while the U-tube tank is not.

With each free-surface tank installation, an operating manual is customarily provided. The manual generally gives a chart showing the appropriate liquid level for matching the tank to the vessel at various resonant frequencies of the vessel. The chart instructs that when the resonant frequency of the ship decreases (decreasing GM), so too must the liquid level in the tank decrease.

The present invention goes contrary to the general practice used throughout the stabilizing tank industry. The present invention contemplates that when the resonant frequency of the ship decreases, the liquid level in the free-surface tank should be decreased, but only to a given limit. The present invention then instructs that the liquid level, rather than being slightly decreased, as taught by the industry, should be substantially increased. Thus, where the trend of the prior art is to decrease liquid level, the present invention makes a substantial departure from the prior art and suggests that the liquid level be increased.

The tank of the present invention is, basically, a free-surface tank. The free-surface tank is used on a ship such as a container ship, when the ship is in its unloaded or in its partially loaded state. When, however, the ship is in its fully loaded state, thus decreasing its GM, the liquid level in the tank is substantially increased. The tank of the present invention is equipped with a pair of upstanding chambers mounted at its extreme longitudinal ends, which chambers are integral with the main body of the tank. The uppermost parts of the upstanding end chambers are vented to the atmosphere, or optionally, are interconnected by means of a crossover duct. Thus, when the container ship is in its fully loaded condition and the liquid level is increased, the tank ceases to be a free-surface stabilizing tank, but because of its upstanding end chambers, becomes a U-tube type stabilizing tank. This conversion brings about a corresponding decrease in the resonant frequency of the tank, thus matching the tank to the ship, without detrimentally affecting the stabilizing moment developed by the tank. Therefore, when the GM of the particular ship is decreased substantially, the conversion from the free-surface tank to the U-tube tank matches the tank to the ship while maximizing the stabilizing capabilities of the tank.

The present invention further involves the method of stabilizing a ship whose GM is apt to change substantially during varying legs of its voyage, by adjusting the tank liquid level so that the tank functions as a free-surface tank at high and intermediate frequencies and functions as a U-tube tank at low frequencies.

BRIEF DESCRIPTION OF THE DRAWINGS

FIG. 1 is a graph showing frequency response plotted against liquid level for a typical free-surface tank;

FIG. 2 is a graph showing frequency response plotted against liquid level for a typical U-tube tank;

FIG. 3 is a cross section through a typical free-surface tank having a relatively high resonant frequency;

FIG. 4 is a cross section through a typical free-surface tank having a relatively low resonant frequency;

FIG. 7 is a cross section through a U-tube type stabilizing tank having a resonant frequency equivalent to the frequency of the tank shown in FIG. 3;

FIG. 8 is a view similar to FIG. 5, but showing a U-tube stabilizer set to resonate at a frequency equal to the frequency of the free-surface tank shown in FIG. 4.

DETAILED DESCRIPTION OF THE DRAWINGS

Figure 5:
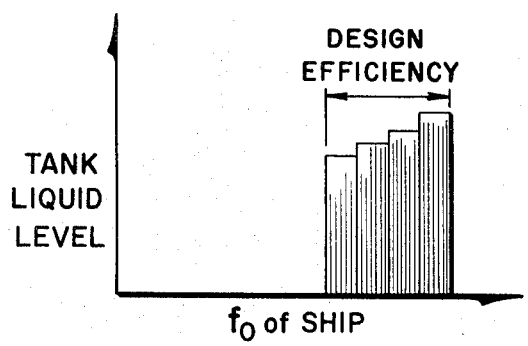
FIG. 5 is a chart of liquid level versus resonant period showing the trend of the prior art.

With reference first to FIGS. 1 and 2, a general description of the relationship between the frequency of a passive stabilizing tank and the level of liquid housed therein will be discussed. The curves of FIGS. 1 and 2 are intended as schematic curves for illustrating a particular point and should not be taken as curves calculated for a particular stabilizing tank.

In FIG. 1, there is illustrated a curve representing the relationship between the tank frequency and the level of tank liquid for a typical free-surface passive stabilizing tank. As the liquid level in the tank increases, so too does the resonant frequency of the tank increase.

It will be remembered that when a vessel is loaded, its GM and thus its resonant frequency generally decrease. Thus, referring to FIG. 1, the frequency represented by $f_2$ could be the frequency of a vessel, such as a container ship, in its unloaded condition. To match a free-surface tank to this unloaded vessel, the tank must be filled to a level $l_2$. If the vessel is then loaded, the frequency of resonance may be reduced to that frequency indicated, in FIG. 1, at $f_1$. At this frequency, the matched tank must have a liquid level $l_1$.

As explained above, a problem exists since there may be occasions where, at a frequency $f_1$, the tank liquid level corresponding to $l_1$ may be extremely low and may, therefore, be too low to develop a large moment to stabilize the vessel against roll. This results because of the limited stabilizing moment generated by the limited amount of tank liquid.

In FIG. 2, there is shown a curve similar to that described above with reference to FIG. 1, but corresponding to the curve of a U-tube type passive stabilizing tank. As explained above, when the level of tank liquid is increased in a U-tube tank, the resonant frequency of the tank decreases. However, when comparing FIGS. 1 and 2, it will be noted that in the low frequency range, the liquid level in a U-tube type stabilizing tank is higher than the liquid level in the free-surface type stabilizing tank. As an example, at the frequency $f_1$, the liquid level $l_1$ for a U-tube stabilizer is substantially higher than the liquid level corresponding to the frequency $f_1$ for a free-surface type tank.

With reference now to FIGS. 3 and 4, a typical free-surface type stabilizer is schematically illustrated with respective liquid levels corresponding to frequencies $f_2$ and $f_1$. As in FIGS. 1 and 2, $f_2$ is higher than $f_1$. In FIG. 3, the free-surface tank is shown generally at 10 and is partially filled with a liquid whose free-surface is indicated at 12. The tank 10, with the liquid level at 12, is tuned to a frequency $f_2$.

FIG. 3 could be taken to show a tank matched to an unloaded container ship; a tank having a resonant frequency matched to the loaded ship could take the form shown in FIG. 4. In this latter-noted figure, it will be seen that the liquid level, shown at 14, is extremely low. This set of conditions corresponds to the set of conditions at frequency $f_1$.

Two problems exist when the tank liquid level is as low as shown in FIG. 4. First, since the maximum stabilizing moment is directly proportional to the amount of liquid in the tank, the maximum stabilizing moment generated by the tank shown in FIG. 4 must necessarily be low. Second, when the tank liquid level is as low as illustrated in FIG. 4, the high side of the tank may "dry out" when the ship rolls severely. This phenomenon partially destroys the operation of the free-surface tank.

With reference to FIG. 5, the trend of the prior art is illustrated. When the resonant frequency of the ship decreases (as it generally does when loaded), the prior art teaches that the liquid level in the free-surface tank be decreased, thus ensuring a match between ship and tank. But, as discussed above, at low frequencies, the tank liquid may be too low to develop a large stabilizing moment.

Figure 6:
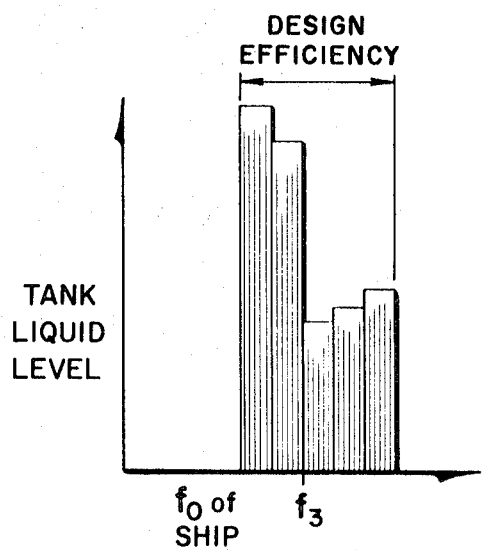
FIG. 6 is a chart similar to that illustrated in FIG. 5, but incorporating the teachings of the present invention.

In FIG. 6, the teachings of the present invention are illustrated. In this figure, it can be seen that the custom of the prior art is followed, but only down to a frequency represented at $f_3$. Then, directly contrary to the teachings of the prior art, the liquid level is abruptly and substantially increased. Then, at still lower frequencies, the liquid level is further increased.

In FIGS. 7 and 8, the tank is similar to that tank shown in FIGS. 3 and 4, but has appended thereto a pair of upstanding end members integral with the lower region of the tank. More particularly, the tank of the present invention, shown generally at 16, comprises a central region 18 and a pair of upstanding end regions 20. The central region 18 is defined by a bottom member 22 and a cover plate 24. It is contemplated that the distance between the bottom member 22 and the cover plate 24 be less than the distance between the bottom and top of the stabilizer shown in FIGS. 3 and 4. The cover plate 24 is most advantageously at a height sufficient to ensure that the tank liquid maintains its free surface under maximum roll conditions and at a maximum expected resonant frequency. Each end chamber 20 is relatively long and terminates in a vent 26, the function of which will be explained below.

The tank shown in FIG. 7 is tuned to the same frequency as is the tank shown in FIG. 3. The liquid level in each tank is at $l_2$. At this liquid level, the tank functions as a free-surface stabilizing tank, unaffected by its cover plate 24.

It will be remembered that at the frequency $f_2$, the associated vessel is in its fully unloaded condition. When the vessel is partially loaded, its resonant frequency is decreased slightly and hence, so too must be the liquid level in the tank to ensure proper tuning between the tank and the ship. This small decrease in liquid level can be tolerated since the stabilizing moment is still sufficient to reduce the roll of the associated vessel. When, however, the ship is in its fully loaded condition, and when, therefore, the GM and thus the resonant frequency of the ship has decreased significantly, a free-surface tank would require a liquid level corresponding to that shown in FIG. 4. In the present invention, however, the liquid level in the tank 16 is not reduced. Instead, at $f_3$ it is increased. This increase, though, reduces the free-surface due to the configuration of the tank and, therefore, matches the tank to the ship due to the decrease in the GM of the ship.

With particular reference now to FIG. 8, the inventive tank 16 is shown with a liquid level sufficient to cause tank resonance at the frequency $f_1$. With the liquid level significantly raised, the tank is changed from a free-surface tank to a U-tube tank. The central region 18, encompassed by the bottom member 22 and the cover plate 24, becomes a communicating duct between the end chambers 20, and the end chambers 20 serve the function well known in a conventional U-tube stabilizer. The function of the vents 26 should now be obvious. When the static liquid level is higher than the cover plate 24, then it is necessary to vent air to the atmosphere to avoid pressure buildup which tends to hinder the free flow of liquid in the tank. Alternately, and as shown in FIG. 9, the vents 26 may be replaced by a crossover duct bridging the two chambers 20.

From the above, it is evident that the problems involved with ships whose GM tend to change substantially during different legs of a voyage have been overcome. While a free-surface passive stabilizer works well within a first range of frequency but poorly in a second range, the present invention relates to a stabilizer which operates with a high efficiency throughout the expected range of frequencies. When the resonant frequency of the vessel is high, or intermediate, the tank of the present invention is made to operate as a free-surface stabilizing tank. When, however, the resonant frequency of the vessel becomes so low that a free-surface tank develops only a small stabilizing moment, the liquid level in the tank is increased substantially and the tank is changed to a U-tube stabilizer.

Figure 9:
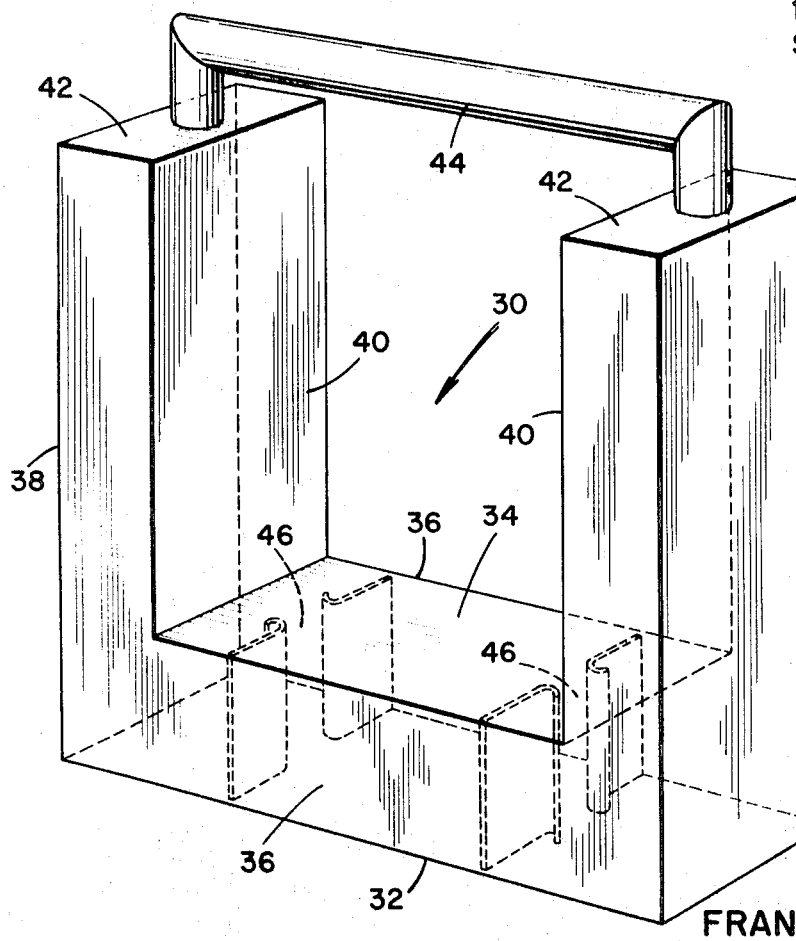
FIG. 9 is a perspective view of a stabilizer constructed in accordance with the teachings of the present invention.

In FIG. 9, there is shown a perspective view of a stabilizing tank constructed in accordance with the present invention. The tank is shown generally at 30 and has a central region defined by a bottom plate 32, a cover plate 34, and a pair of side plates 36. Integral with the central region is a pair of upstanding end regions, each end region defined by the side plates 36, an outer vertical plate 38, and an inner vertical plate 40. Each end chamber is closed, at its top, by a cover plate 42. The chambers communicate with one another through an optional crossover duct 44. The tank is further equipped with a pair of nozzles 46 serving as damping means to ensure a flat phase curve.

Above, there has been described one preferred embodiment of the present invention. It should be noted, however, that many alterations and modifications may be practiced by those skilled in the art without departing from the spirit and the scope of the present invention. Accordingly, it is the intention that this invention not be limited by the above, but only be limited as defined in the appended claims.

What is claimed is:

1. The method of stabilizing a vessel whose GM changes substantially during different legs of a voyage, wherein the vessel is equipped with a passive stabilizing tank having a central region and a pair of upstanding end regions associated so as to define a U-shaped cross section, the method comprising the steps of: partially filling the tank with a liquid so that the tank functions as a free-surface stabilizing tank when the associated vessel has a resonant frequency in the high or intermediate frequency range; and adjusting the liquid level in the tank so that the tank functions as a U-tube stabilizing tank when the associated vessel has a resonant frequency in the low frequency range.

2. The method of stabilizing a vessel whose GM changes substantially during different legs of a voyage, wherein the vessel is equipped with a passive stabilizing tank having a central region and a pair of upstanding end regions associated so as to define a U-shaped cross section, the method comprising the steps of: adjusting the liquid level in the tank so that the tank resonance is substantially equivalent to the resonance of the associated vessel and so that the static tank liquid level is below the tank top when the vessel resonance is in the high or intermediate ranges of the frequency spectrum; and adjusting the liquid level in the tank so that the tank resonance is substantially equivalent to the resonance of the associated vessel and so that the static tank liquid level is above the tank top when the vessel resonance is in the low ranges of the frequency spectrum.

References Cited

UNITED STATES PATENTS

| 3,103,198 | 9/1963 | Ripley | 114—125 |
| 3,109,403 | 11/1963 | Ripley | 114—125 |

FOREIGN PATENTS

| 1,006,036 | 9/1965 | Great Britain | 114—125 |

TRYGVE M. BLIX, Primary Examiner